(12) United States Patent
Merminod et al.

(10) Patent No.: US 6,505,112 B1
(45) Date of Patent: Jan. 7, 2003

(54) ELECTROMAGNETIC VALVE FOR GASEOUS FLUIDS

(75) Inventors: Antoine Merminod, Cully (CH); Sebastien Germano, Romanel s/Lausanne (CH)

(73) Assignee: Landi Renzo SpA, Cavriago (IT)

( * ) Notice: Subject to any disclaimer, the term of this patent is extended or adjusted under 35 U.S.C. 154(b) by 0 days.

(21) Appl. No.: 09/674,429

(22) PCT Filed: May 5, 1999

(86) PCT No.: PCT/EP99/03102

§ 371 (c)(1), (2), (4) Date: Jan. 12, 2001

(87) PCT Pub. No.: WO99/57465

PCT Pub. Date: Nov. 11, 1999

(30) Foreign Application Priority Data

May 5, 1998 (SE) ................................................ 9801588

(51) Int. Cl.$^7$ .............................. F16K 31/06; H01F 7/16
(52) U.S. Cl. ............. 701/103; 251/129.16; 251/129.11; 239/585.1
(58) Field of Search ........................ 123/472; 239/585.1, 239/585.3; 251/129.01, 129.11, 129.12, 129.13, 129.21, 129.22, 129.16; 701/103

(56) References Cited

U.S. PATENT DOCUMENTS

| | | | | |
|---|---|---|---|---|
| 2,631,612 A | | 3/1953 | Buescher ............... | 251/129.16 |
| 2,910,249 A | * | 10/1959 | Gunkel ........................ | 239/548 |
| 2,922,614 A | * | 1/1960 | Nickels .................. | 251/129.22 |
| 4,655,396 A | * | 4/1987 | Taxon et al. ............. | 239/585.3 |
| 4,925,155 A | * | 5/1990 | Carman .................. | 251/129.22 |
| 4,958,774 A | * | 9/1990 | Taylor ..................... | 239/585.3 |
| 5,086,980 A | * | 2/1992 | Hickey .................... | 239/585.3 |
| 5,178,332 A | * | 1/1993 | Tsukakoshi et al. ...... | 239/585.3 |
| 5,348,233 A | * | 9/1994 | Press et al. .............. | 239/585.3 |
| 5,381,966 A | * | 1/1995 | Gernert, II ................ | 239/585.1 |
| 6,161,783 A | * | 12/2000 | Press ........................ | 239/585.3 |

* cited by examiner

*Primary Examiner*—Hieu T. Vo
(74) *Attorney, Agent, or Firm*—Young & Thompson

(57) ABSTRACT

An electromagnetic valve for a gaseous fluid includes a combination of an electromagnetic circuit which when activated generates an electromagnetic force for mechanical opening or closing of the valve and a movable disk formed member at least part of which is included in the electromagnetic circuit. The disk formed member is guided in a linear movement perpendicular to the surface of the disk formed member. The valve further includes a valve seat cooperating with the disk formed member providing the mechanical closing and sealing of the valve. A resilient member acts on the disk formed member and a metering device in the form of a restriction arranged immediately downstream of the valve seat creates sonic conditions for the gas flow which makes the gas flow with the valve open independent of fluctuations in the downstream pressure.

9 Claims, 1 Drawing Sheet

ELECTROMAGNETIC VALVE FOR GASEOUS FLUIDS

TECHNICAL FIELD

The present invention relates to an electromagnetic valve for gaseous fluids. This type of valve has a special application as injector valve for gaseous fuels for internal combustion engines. The invention therefore also relates to an internal combustion engine provided with one or several such valves.

BACKGROUND ART

The problems caused by atmospheric pollution by means of exhaust gases from internal combustion engines such as car motors incite scientists and car manufacturers to look for new fuels and alternate fuels like for instance compressed natural gas or liquefied petroleum gas (LPG) which potentially offer an important reduction of the emission of polluting gases and greenhouse gases.

The present solutions for injection and metering of these new fuels for an internal combustion engine offer however not yet performances equal to the solutions used for normal petrol.

The principle for the known fuel systems for metering and mixing a gaseous fuel with inlet air to an internal combustion engine are based on the Venturi effect or on continuous injection of fuel. These systems have, however, typically an important number of mechanical components and do not offer the response times adequate to satisfy the sometimes important variations in the demand for fuel by the engine.

Thus, when these known injection systems for gaseous fuel are working together with for instance an associated exhaust gas purification system of the three-way catalytic converter type with lambda-probe control, their characteristics do not allow for the maintenance of the air to fuel ratio at the desired value during fast transitions in the engine load and speed in order to give an optimal purification of the exhaust gases.

DISCLOSURE OF THE INVENTION

One object of the present invention is to provide an electromagnetic valve for general gaseous fluids which can be used in many industrial applications in which there is a need for a simple wear resistant valve with an extremely short response time.

Another object of the invention is to provide an electromagnetic injector valve for gaseous fuels to e.g. an internal combustion engine. Such an injector valve could be mounted on the inlet or inlet manifold of an internal combustion engine for injecting the fuel. Due to the short response time of the valve it could be operated in pulsating mode.

The total response time for a traditional injection system for gaseous fuel is due to the operation of the actuator or actuators which are used for metering the fuel, the time for the transport of the gas mixture through the inlet tube or manifold to the respective cylinder and the characteristics for the transport of the fuel through the feeding tubes to the manifold.

The above and further objects are achieved by means of the present invention which is characterised in that the valve comprises:

- an electromagnetic circuit which when activated generates an electromagnetic force for mechanical opening or closing of the valve,
- a movable disk formed member at least part of which is included in said electromagnetic circuit and which disk formed member is guided in a linear movement perpendicular to the surface of said disk formed member,
- a valve seat co-operating with the disk formed member providing the mechanical closing and sealing of the valve,
- a resilient means which acts on the disk formed member,
- a hole arranged downstream said valve seat the diameter of which hole preferably defines a sonic section for the gas flow which makes it possible to precisely adjust the quantity of gas let through as a function of the time during which the valve is in its open position irrespective of the downstream pressure.

Important advantages with a valve according to the invention is that it only has one (two if you count the spring) moving part(s), low inertia, extremely short response time and that it is very wear resistant.

When this type of valve is used as an injector valve for gaseous fuel for an internal combustion engine it makes possible the use of a pulsating mode for the injection of gas into the air flow introduced through the inlet or inlet manifold into the internal combustion engine allowing an optimal mixing of the two flows.

Due to the very simple but original design the reliability and life time are excellent.

BRIEF DESCRIPTION OF THE DRAWINGS

Other objects, uses and advantages of this invention will be apparent from the reading of this description which proceeds with reference to the accompanying drawings forming part thereof and wherein.

DETAILED DESCRIPTION OF THE INVENTION

The invention will now be further described by means of a particular embodiment.

Figure 1:
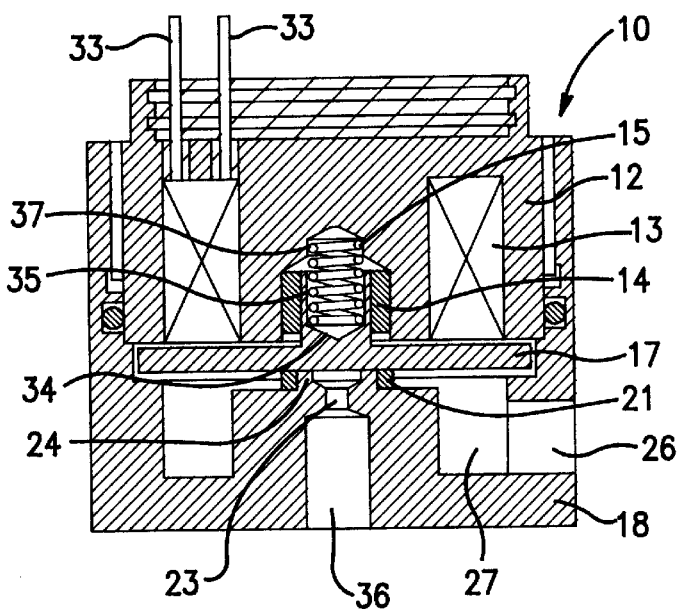
FIG. 1 shows a section through the electromagnetic valve for a gaseous fluid according to the invention.

FIG. 1 shows a section through an electromagnetic valve for gaseous fluids according to the invention. This particular embodiment of the valve could be used as an electromagnetic injector valve for gaseous fuels for an internal combustion engine. Due to its characteristics it could in that particular application be controlled in order to give indirect, pulsating injection of gaseous fuels under pressure into the engine. Indirect injection refers to the injection mode according to which the gaseous fuel is added to the flow of air fed to the cylinder or cylinders. The valve could be mounted very close to the inlet of the motor in order to give a very short over all response time for the fuel system. On a multiple cylinder engine a common valve could be used for all cylinders with a distribution of the air-gas mixture through the manifold to each respective inlet. In another configuration one separate valve for each cylinder could be mounted on the manifold close to the respective inlet. This gives the advantage of individual metering the fuel to each respective cylinder.

The electromagnetic valve with the general designation 10 comprises a magnetic circuit having a fixed armature 12 and a disk formed member 17 forming a movable part of said magnetic circuit It should be noted that only part of the disk formed member has to be able to conduct the magnetic field. A solenoid coil 13 is arranged in an annular groove in the fixed armature 12. Electrical connections 33 on the solenoid coil are arranged to receive electrical energy which allows the activation of the electromagnetical valve by generating a magnetic force which will displace the disk formed member 17.

An annular valve seat 24 is arranged to co-operate with the disk formed member and a resilient member in e.g. the form of a spring 15 is in this embodiment biasing the disk formed member into contact with the valve seat 24 when the valve is not activated. The valve is thus normally closed A general purpose valve of this type could of course be designed to be normally open.

In the illustrated embodiment the disk formed member 17 is circular and is provided with a concentric cylindrical guiding member or shaft 34 fixed to and arranged perpendicularly to the upper surface of the disk formed member for guiding the movement of said disk formed member in a direction perpendicular to the surface of the disk.

The guiding member 34 of the disk formed member 17 is in this embodiment arranged in an appropriate slide bearing 14 at the center of the fixed armature 12. The bearing could be of the self lubricating type.

The resilient member 15 is in this case arranged between the guiding member and the fixed armature. In the embodiment illustrated in FIG. 1 the guiding member 34 forms a tube the cylindrical interior 35 of which is arranged to receive the lower part of said resilient member in the form of a spring 15. The upper part of the spring 15 is arranged in a cylindrical cavity 37 in the center of the armature 12. The cylindrical external surface of the guiding member is sliding in the bearing 14 and is guiding the disk formed member 17 in its movement.

In other embodiments of the valve according to the invention the guiding of the disk formed member could be achieved at the periphery of said disk. In that case no central guiding member 34, and co-operating slide bearing 14 will be necessary. The resilient means 15 could of course also be arranged at the periphery of the disk formed member and does not have to have the form of a spring. It could for instance be realized in the form of a ring of elastic material.

In order to keep the response time of the valve small it is important that there is always the same pressure on both sides of the disk thus also at start up when pressurised gas suddenly is entering the inlet 26 of the valve. This can be achieved by means of e.g. a by-pass channel in the body of the valve letting both sides of the disk communicate pneumatically. Appropriate holes in the disk could give the same result. The gas could also be allowed to circulate around the edge of the disk between the disk and the inner surface of the valve housing. In order to quickly equilibrate the pressure on the two sides of the disk formed member a thin disk provided with at least one radial slot starting from the periphery of the disk could be arranged on top of the disk formed member 17.

Figure 2:
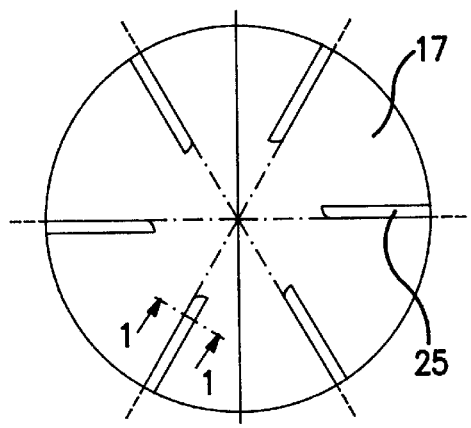
FIG. 2 shows one embodiment of the lower surface of the disk formed member 17.
Figure 3:
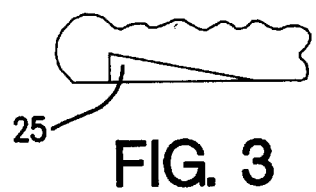
FIG. 3 shows a section through the disk formed member 17 according to FIG. 2.
Figure 6:
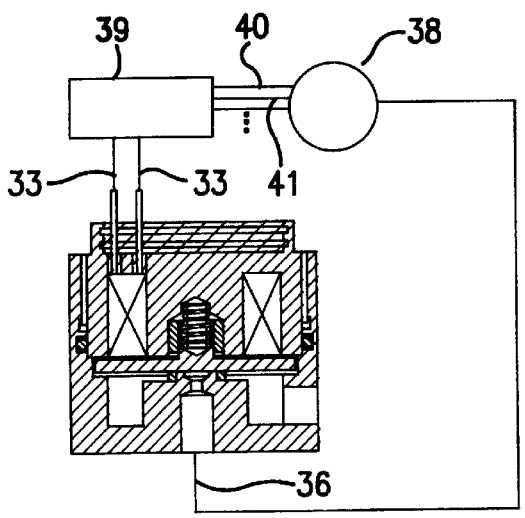
FIG. 6 shows an internal combustion engine With an injector valve according to the invention.
Figure 4:
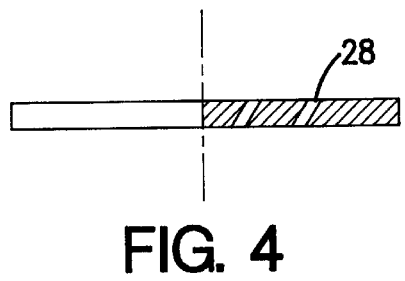
FIGS. 4 and 5 show two other embodiments of the disk formed member.
Figure 5:
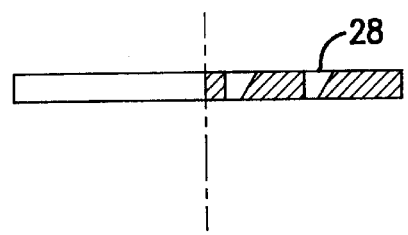

In a particular embodiment of the valve according to the invention as illustrated in FIGS. 1–3 for use as an injector valve the disk formed member is only moving 0.3 mm which means that the gas turbulence around the edge is of negligible importance.

The disk 17 could also have a considerably smaller diameter than is shown in FIG. 1 and be provided with impeller blades at the periphery.

In the illustrated embodiment the activation of the electromagnetic circuit will move the disk formed member upwards in FIG. 1 and thus open the valve.

An inlet opening 26 for gaseous fluid of fuel is arranged on the side of the body 18 of the injector valve The inlet opening could of course be arranged differently.

The annular valve seat 24 is sealing against the lower surface of the disk formed member 17 at rest. Preferably a ring 21 of e.g. a somewhat elastic material like a polymer forms the seat. This allows on one hand the absorption of the energy of the shock when the disk is landing on the seat due to the deactivation of the solenoid 13, and on the other hand it allows for excellent sealing of the valve so that the gaseous fluid can not circulate from the inlet 26 through the valve to the outlet conduit 36 when the valve is closed.

When the solenoid 13 is electrically activated, the disk formed member 17 at least part of which is included in the electromagnetic circuit moves from the lower position towards an upper position in FIG. 1 and allows the flow of gaseous fluid from the inlet conduit 26 via a coaxial annular cavity 27 arranged under the disk to further pass between the disk and the annular seat in the direction of the downstream passage 23 and the outlet conduit 36. The sectional area of the passage 23 of the valve is in this embodiment precisely defined in order to get a sonic flow of the gaseous fluid through the valve. This means that the flowrate will be independent of the pressure on the downstream side of the valve which is very important in an application as injector valve as this pressure changes considerably during the engine working cycle. At the same time the opening between the seat 24 and the disk in the fully open position of the valve is defined so that it is much bigger than the area of the hole 23 which will allow for the sonic flow in the hole 23. Thus the flow of gaseous fluid only depends on the pressure of the gaseous fluid on the inlet to the valve 10.

In a preferred embodiment the disk formed member 17 is provided with grooves 25 arranged radially on its lower surface as shown in FIG. 2. These grooves have an inclined section which is causing a rotation of the disk 17 when the gaseous fluid circulate from the inlet conduit 26 through the valve towards the outlet conduit 36. The stepwise rotation of the disk 17 allows for a uniform wear of the seat 24, the disk 17 in the area where it touches the seat 24 in the closed position, the guiding member 34 on the disk 17 and the slide bearing 14.

The rotation of the disk could also be achieved by means of e.g. through holes having side walls inclined in relation to the lower and upper surfaces of the disk 17 or slots 28 arranged radially in the disk 17 also having an inclined section.

Outside the central area of the disk which is cooperating with the valve seat disk material could be removed in order to lower the mass of the disk 17.

When the valve is used as an injector valve for an internal combustion engine 38 the electrical conductors 33 of the solenoid 13 could be connected to a control unit 39 which delivers the control signal for activating the valve. Preferably a number of probes 40, 41, . . . arranged on the engine are measuring relevant control parameters which are fed to the control unit in which a calculation according to some appropriate control algorithm is carried out and a resulting control signal is generated. This arrangement allows for the injection of a gaseous fuel with a variable duration and variable frequency, thus with a variable volume, and with a variable phase. The injector valve could consequently deliver fuel at any particular moment of the cycle of the engine, even when the respective inlet valve(s) of the engine is (are) closed. The appropriate air-gas mixture is in such a case momentarily stored in the manifold waiting for the next opening of the respective valve.

What is claimed is:

1. An electromagnetic valve for a gaseous fluid comprising a combination of:
   an electromagnetic circuit which when activated generates an electromagnetic force for mechanical opening or closing of the valve;
   a movable disk formed member at least part of which is included in said electromagnetic circuit and said disk formed member is guided in a linear movement perpendicular to a surface of said disk formed member;
   a valve seat cooperating with the disk formed member providing the mechanical closing and sealing of the valve;
   a resilient member which acts on the disk formed member; and
   a metering member in the form of a restriction arranged immediately downstream of the valve seat creating sonic conditions for the gas flow which makes the gas flow with the valve open independent of fluctuations in the downstream pressure;
   said movable disk formed member has a circular form and is provided with a concentric cylindrical guiding member or shaft fixed to and arranged perpendicularly to an upper surface of the disk formed member arranged in an appropriate slide bearing at a center of a fixed armature of the electromagnetic circuit for guiding the movement of said disk formed member in a direction perpendicular to the surface of the disk.

2. Electromagnetic valve according to claim 1, characterised in that said slide bearing (14) does not need lubrication.

3. The electromagnetic valve according to claim 1, wherein said valve seat has an annular form and seals against a lower surface of the disk formed member at rest.

4. The electromagnetic valve according to claim 1, wherein said valve seat is provided with a ring of an elastic material which allows the absorption of energy of a shock when the disk lands on the seat due to deactivation of a solenoid of the electromagnetic circuit thereby limiting rebounds, and allows for sealing of the valve when closed.

5. The electromagnetic valve according to claim 1, wherein said resilient member has the form of a spring arranged at the center of the disk formed member.

6. The electromagnetic valve according to claim 1, wherein said disk formed member is provided with grooves arranged radially on a lower surface, said grooves have an inclined section which causes a rotation of the disk when the gaseous fluid circulates from an inlet conduit of the valve, through the valve towards an outlet conduit of the valve.

7. The electromagnetic valve according to claim 1, wherein said disk formed member is provided with slots arranged radially in the disk having an inclined section which causes a rotation of the disk when the gaseous fluid circulates from an inlet conduit of the valve through the valve towards an outlet conduit of the valve.

8. The electromagnetic valve according to claim 1, wherein said disk formed member is provided with at least one through hole having side walls inclined in relation to a lower surface and the upper surface of the disk which will cause a rotation of the disk when the gaseous fluid circulates from an inlet conduit of the valve through the valve towards an outlet conduit of the valve.

9. An internal combustion engine comprising:
   at least one injector valve for gaseous fuel, said injector valve comprising a combination of:
      an electromagnetic circuit having an activating coil, said electromagnetic circuit when activated generates an electromagnetic force for mechanical opening or closing of the valve;
      a movable disk formed member at least part of which is included in said electromagnetic circuit and said disk formed member is guided in a linear movement perpendicular to a surface of said disk formed member;
      a valve seat cooperating with the disk formed member providing the mechanical closing and sealing of the valve;
      a resilient member which acts on the disk formed member; and
      a metering member in the form of a restriction arranged immediately downstream of the valve seat creating sonic conditions for the gas flow which makes the gas flow with the valve open independent of fluctuations in the downstream pressure;
   a control unit connected to said activating coil; and
   at least one probe arranged on the engine to measure relevant control parameters and feed corresponding electrical signals to said control unit arranged to calculate according to some appropriate control algorithm a resulting control signal which is fed to electrical connections on the activating coil which allows the activation of the electromagnetic valve, making it possible to inject a predetermined amount of gaseous fuel at any particular moment of the cycle of the engine into the air fed to said engine.

* * * * *